United States Patent
Lee et al.

(10) Patent No.: US 10,408,454 B2
(45) Date of Patent: Sep. 10, 2019

(54) GAS TURBINE ENGINE FLOW REGULATING

(71) Applicants: WOODWARD, INC., Fort Collins, CO (US); THE UNITED STATES OF AMERICA, as represented by National Aeronautics and Space Administration, Washington, DC (US)

(72) Inventors: Fei Philip Lee, Holland, MI (US); Hukam Chand Mongia, West Lafayette, IN (US); Kathleen M. Tacina, Berea, OH (US); Chi-Ming Lee, Strongsville, OH (US); Daniel L. Bulzan, Rocky River, OH (US)

(73) Assignee: Woodward, Inc., Fort Collins, CO (US)

( * ) Notice: Subject to any disclaimer, the term of this patent is extended or adjusted under 35 U.S.C. 154(b) by 916 days.

(21) Appl. No.: 14/899,982

(22) PCT Filed: Jun. 18, 2013

(86) PCT No.: PCT/US2013/046413
§ 371 (c)(1),
(2) Date: Dec. 18, 2015

(87) PCT Pub. No.: WO2014/204449
PCT Pub. Date: Dec. 24, 2014

(65) Prior Publication Data
US 2016/0138807 A1    May 19, 2016

(51) Int. Cl.
*F02C 1/00* (2006.01)
*F23R 3/14* (2006.01)
(Continued)

(52) U.S. Cl.
CPC ............... *F23R 3/14* (2013.01); *F23C 7/008* (2013.01); *F23R 3/10* (2013.01); *F23R 3/26* (2013.01);
(Continued)

(58) Field of Classification Search
CPC .. F23R 3/26; F23R 3/10; F23D 11/408; F23D 2203/007; F23C 7/02
See application file for complete search history.

(56) References Cited

U.S. PATENT DOCUMENTS 3,283,802 A    11/1966 Couvelas
3,763,650 A    10/1973 Hussey et al.
(Continued)

FOREIGN PATENT DOCUMENTS

CN    1715745 A    1/2006
CN    101069040 A    11/2007
(Continued)

OTHER PUBLICATIONS

Office Action issued in Chinese Application No. 201380078939.3 dated Feb. 12, 2018; 8 pages with English Translation.
(Continued)

*Primary Examiner* — Gerald L Sung
(74) *Attorney, Agent, or Firm* — Fish & Richardson P.C.

(57) ABSTRACT

A gas turbine combustor assembly includes a fuel injector, a dome stator around the fuel injector, and a dome sleeve coupled to the dome stator. The dome sleeve defines an air inlet opening with the dome stator, and is carried to move with respect to the dome stator to change a flow area of the air inlet opening. The dome sleeve also defines a nozzle sloping downstream from the air inlet opening toward an outlet of the combustor assembly. The sloping nozzle defines an annular pinch gap adjacent an outlet of the fuel injector,
(Continued)

and is coupled to move with the dome sleeve to change a flow area through the pinch gap.

22 Claims, 10 Drawing Sheets

(51) Int. Cl.
| | |
|---|---|
| *F23R 3/10* | (2006.01) |
| *F23R 3/26* | (2006.01) |
| *F23C 7/00* | (2006.01) |
| *F23R 3/28* | (2006.01) |
| *F23R 3/36* | (2006.01) |

(52) U.S. Cl.
CPC ............... *F23R 3/286* (2013.01); *F23R 3/36* (2013.01); *F23D 2900/11101* (2013.01); *F23D 2900/11402* (2013.01)

(56) References Cited

U.S. PATENT DOCUMENTS

| | | | |
|---|---|---|---|
| 3,869,246 A * | 3/1975 | Hammond, Jr. ......... | F23C 7/008 431/184 |
| 3,905,192 A | 9/1975 | Pierce et al. | |
| 4,007,001 A * | 2/1977 | Schirmer ................. | F23C 6/045 431/10 |
| 4,007,002 A * | 2/1977 | Schirmer ................. | F23C 6/04 431/10 |
| 4,430,860 A * | 2/1984 | Melchior ................. | F23R 3/26 60/606 |
| 4,542,622 A * | 9/1985 | Greene .................... | F23C 7/004 239/406 |
| 4,677,822 A * | 7/1987 | Iizuka ...................... | F23R 3/26 60/39.23 |
| 4,754,600 A * | 7/1988 | Barbier ................... | F23C 7/008 60/39.23 |
| 4,903,478 A * | 2/1990 | Seto ........................ | F02C 7/222 60/39.281 |
| 5,197,290 A | 3/1993 | Lee et al. | |
| 5,333,459 A | 8/1994 | Berger | |
| 5,343,693 A | 9/1994 | Komatsu et al. | |
| 5,373,693 A | 12/1994 | Zarzalis et al. | |
| 5,417,054 A | 5/1995 | Lee et al. | |
| 5,490,378 A | 2/1996 | Berger et al. | |
| 5,505,045 A | 4/1996 | Lee et al. | |
| 5,572,862 A | 11/1996 | Mowill | |
| 5,573,395 A | 11/1996 | Althaus et al. | |
| 5,647,538 A | 7/1997 | Richardson | |
| 5,664,412 A | 9/1997 | Overton | |
| 5,749,219 A | 5/1998 | DuBell | |
| 5,836,163 A | 11/1998 | Lockyer et al. | |
| 5,836,164 A | 11/1998 | Tsukaharar et al. | |
| 5,930,999 A | 8/1999 | Howell et al. | |
| 5,996,333 A * | 12/1999 | Forestier ................. | F23R 3/26 60/39.23 |
| 6,089,170 A | 7/2000 | Conti et al. | |
| 6,199,367 B1 | 3/2001 | Howell | |
| 6,442,940 B1 * | 9/2002 | Young ...................... | F23R 3/14 29/890.01 |
| 6,530,223 B1 | 3/2003 | Dodds et al. | |
| 6,623,267 B1 | 9/2003 | Golladay, Jr. | |
| 7,200,986 B2 | 4/2007 | Sanders | |
| 7,302,801 B2 | 12/2007 | Chen | |
| 7,415,826 B2 | 8/2008 | McMasters et al. | |
| 7,500,347 B2 | 3/2009 | Sanders et al. | |
| 7,762,073 B2 | 7/2010 | Li et al. | |
| 7,827,795 B2 | 11/2010 | Hicks et al. | |
| 7,832,377 B2 | 11/2010 | Lee et al. | |
| 8,001,761 B2 | 8/2011 | Myers, Jr. et al. | |
| 8,205,643 B2 | 6/2012 | Lee et al. | |
| 8,234,873 B2 | 8/2012 | Houtman et al. | |
| 8,522,555 B2 | 9/2013 | Berry et al. | |
| 9,188,341 B2 | 11/2015 | McMasters et al. | |
| 2007/0028620 A1 | 2/2007 | McMasters et al. | |
| 2007/0074452 A1 | 4/2007 | Yates | |
| 2008/0163627 A1 | 7/2008 | Elkady et al. | |
| 2009/0031728 A1 | 2/2009 | Milura et al. | |
| 2010/0051724 A1 | 3/2010 | Hicks et al. | |
| 2011/0056205 A1 | 3/2011 | Carroni | |
| 2011/0061389 A1 * | 3/2011 | Zuo ........................ | F23C 7/006 60/737 |
| 2012/0031097 A1 | 2/2012 | McMahan | |
| 2012/0234013 A1 | 9/2012 | Overman et al. | |
| 2013/0036741 A1 | 2/2013 | Prociw | |
| 2013/0174571 A1 | 7/2013 | Abe et al. | |
| 2015/0128607 A1 | 5/2015 | Lee et al. | |
| 2015/0211742 A1 | 7/2015 | Lee et al. | |

FOREIGN PATENT DOCUMENTS

| | | |
|---|---|---|
| CN | 101294714 | 10/2008 |
| CN | 102927592 A | 2/2013 |
| EP | 2415993 | 2/2012 |
| EP | 2458284 | 5/2012 |
| EP | 2557362 | 2/2013 |
| EP | 2626635 | 8/2013 |
| JP | H05185537 | 1/1993 |
| WO | WO2010128882 | 11/2010 |

OTHER PUBLICATIONS

Office Action issued in Chinese Application No. 201380078939.3 dated Jul. 4, 2017; 17 pages.
Communication Pursuant to Article 94(3) EPC, European Application No. 13737901.2, dated Jun. 20, 2017, 4 pages.
Authorized Officer Reni De Meester, PCT International Search Report and Written Opinion, PCT/US2013/046413, dated Apr. 4, 2014, 14 pages.
Written Opinion of the International Preliminary Examining Authority issued in International Application No. PCT/US2013/046413 dated Jul. 14, 2015; 8 pages.
International Preliminary Report on Patentability issued in International Application No. PCT/US2013/046413 dated Oct. 28, 2015; 9 pages.

* cited by examiner

GAS TURBINE ENGINE FLOW REGULATING

STATEMENT OF GOVERNMENT INTEREST

This invention was made with government support under NASA Contract Number NNC11CA17C awarded by National Aeronautics Space Administration (NASA). The government has waived its rights in the invention.

CROSS-REFERENCE TO RELATED APPLICATIONS

This application is a U.S. National Phase Application under 35 U.S.C. § 371 and claims the benefit of priority to International Application No. PCT/US2013/046413, filed on Jun. 18, 2013, the contents of which are hereby incorporated by reference.

TECHNICAL FIELD

This specification generally relates to combustor assemblies for gas turbine engines.

BACKGROUND

The gas turbine engine is the preferred class of internal combustion engine for many high power applications. Fundamentally, the gas turbine engine features an upstream rotating compressor coupled to a downstream turbine, and a combustion chamber in-between. One of the driving factors in modern gas turbine engine design is emissions reduction, and the combustor is the primary contributor in this regard. Combustion of the hydrocarbon fuel in air inevitably produces harmful emissions, such as oxides of nitrogen (NOx). NOx emissions are the subject of increasingly stringent controls by regulatory authorities. NOx emissions scale with the temperature of the combustion flame. The combustion flame temperature is product of several factors, including the fuel-air ratio. A lean fuel-air ratio is likely to produce less NOx emissions, but can cause problems in maintaining the stability of the combustion flame. Thus, new concepts are continuously sought to achieve low NOx emissions with a stable combustion flame.

BRIEF DESCRIPTION OF THE DRAWINGS

Like reference numbers and designations in the various drawings indicate like elements.

DETAILED DESCRIPTION

Figure 1:
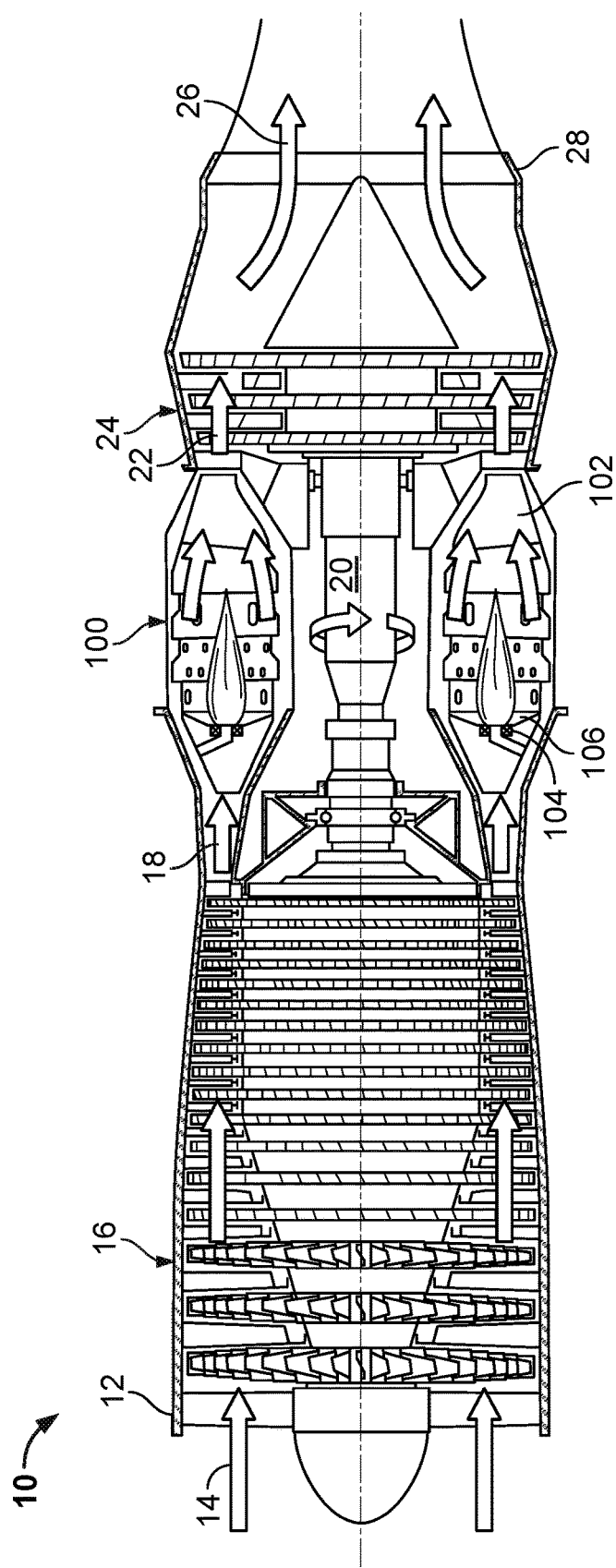
FIG. 1 is a half, side cross-sectional view of an example gas turbine engine.

FIG. 1 is a half, side cross-sectional view of an example gas turbine engine 10. The gas turbine engine 10 is turbojet-type gas turbine that could be used, for example, to power jet aircrafts. However, it is appreciated that the concepts described in the present disclosure are not so limited, and can be incorporated in the design of various other types of gas turbine engines (e.g., turbofan, turboprop, turboshaft, or industrial/marine engines).

As shown, the gas turbine engine 10 generally facilitates a continuous axial flow of gas. That is, gas generally flows through the engine 10 in the axially downstream direction indicated by the arrows in FIG. 1. The gas turbine engine 10 includes an intake 12 that receives ambient air 14 and directs the ambient air to a compressor 16. The ambient air 14 is drawn through multiple stages of the compressor 16. High-pressure air 18 exiting the compressor 16 is introduced to a combustor 100. In certain instances the combustor 100 is an annular combustor circumscribing the engine's main shaft 20 or a can-type combustor positioned radially outward of the shaft.

The combustor 100 includes a combustion shield 102, multiple fuel injectors 104, and a combustor dome 106. At the combustor 100, the high-pressure air 18 is mixed with liquid hydrocarbon fuel (not shown) and ignited to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine by the main shaft 20. Exhaust gas 26 leaving the turbine 24 is accelerated into the atmosphere through an exhaust nozzle 28 to provide thrust or propulsion power.

Figure 2:
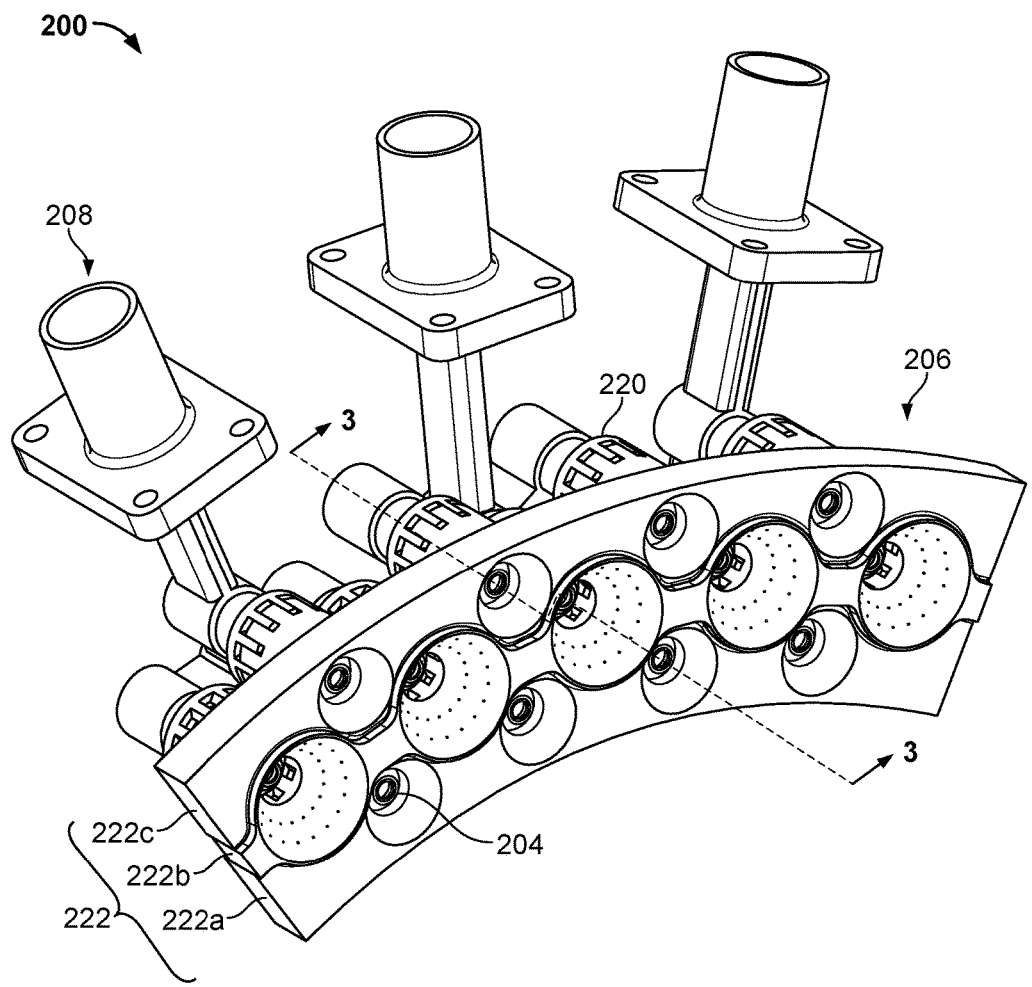
FIG. 2 is a perspective view of a triple-dome annular gas turbine combustor assembly.
Figure 3A:
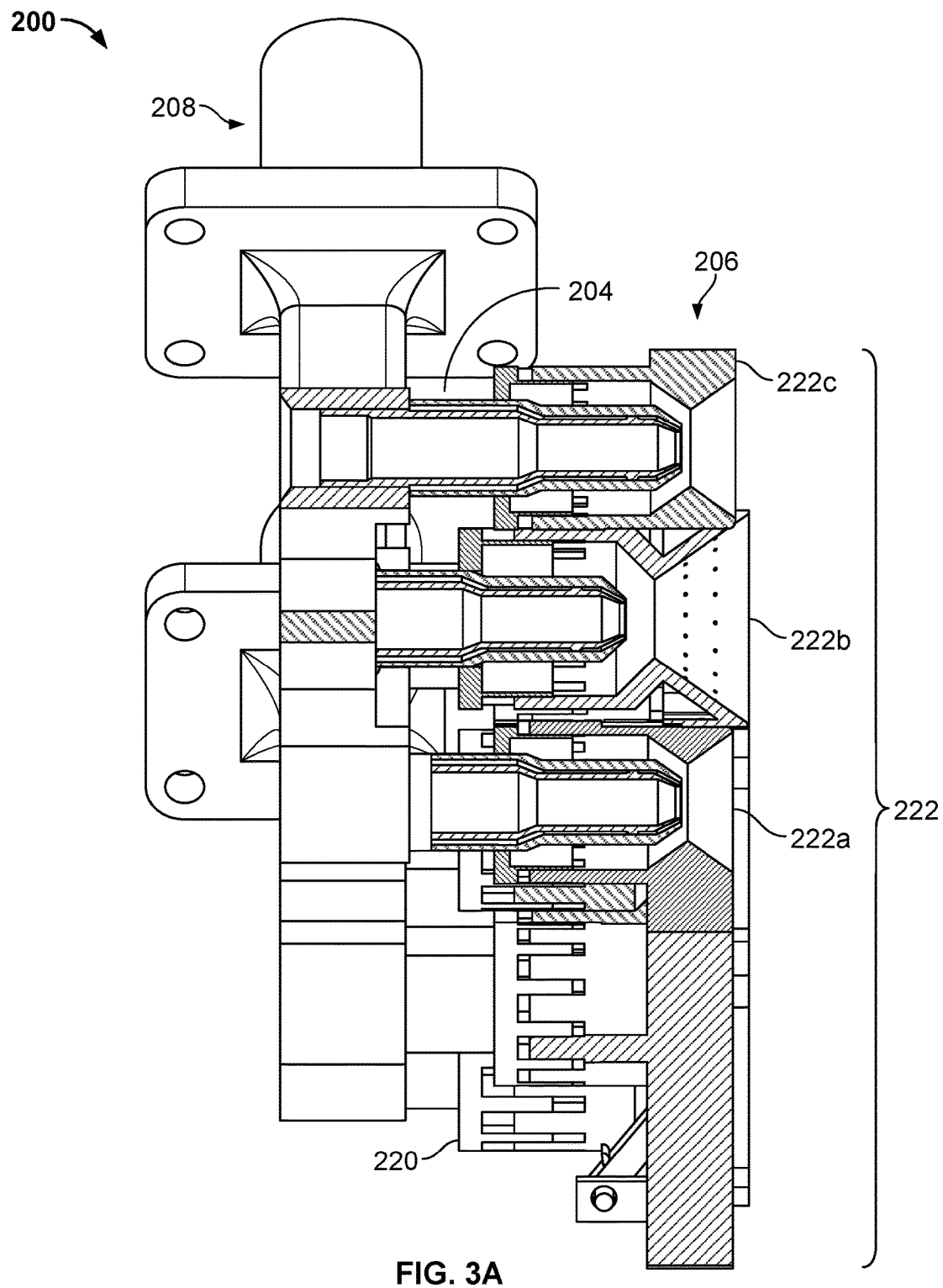
FIG. 3A is a cross-sectional view, taken along the line 3-3, of the gas turbine combustor assembly shown in FIG. 2.

FIG. 2 is a perspective view of an arc segment of an example triple-dome annular gas turbine combustor assembly 200. In this example, the arc segment is part of an uninterrupted ring structure. A partial view of the full ring structure is provided here so that individual components can be seen with clarity. However, it is appreciated that several individual arc segments could be combined to create a full ring-shaped structure. The combustor assembly 200 can, for example, be incorporated in the gas turbine engine 10. FIG. 3A is a cross-sectional view of the gas turbine combustor assembly 200 taken along the line 3-3 in FIG. 2. As shown, the combustor assembly 200 features a collection of fuel injectors 204 and an annular combustor dome 206. The fuel injectors 204 are mounted on fuel injector support structures 208. The fuel injector support structures 208 are designed to carry the fuel injectors 204 and to supply the fuel injectors 204 with liquid or gaseous fuel. Each of the fuel injector support structures 208 caries multiple fuel injectors 204. Liquid or gaseous fuel is routed to the fuel injectors 204 through passages formed on the interior of the fuel injector support structures 208. A fuel delivery system (not shown) is used to supply fuel to the fuel injectors 204 from one or more fuel sources (not shown).

In some examples, the fuel delivery system is a multi-stage fuel injection system designed to supply fuel independently to different groups of fuel injectors 204. For instance, the fuel delivery system can supply fuel to a first group of fuel injectors 204 at one flow rate and to a second group of fuel injectors at a different (lesser or greater) flow rate. As another example, the fuel delivery system can supply fuel to the first group of fuel injectors 204, but not supply fuel to the second group of fuel injectors. The fuel delivery system can be designed to separately control any number of groups of fuel injectors 204. The complexity of the fuel delivery systems scales with the number of control groups of fuel injectors.

Figure 3B:
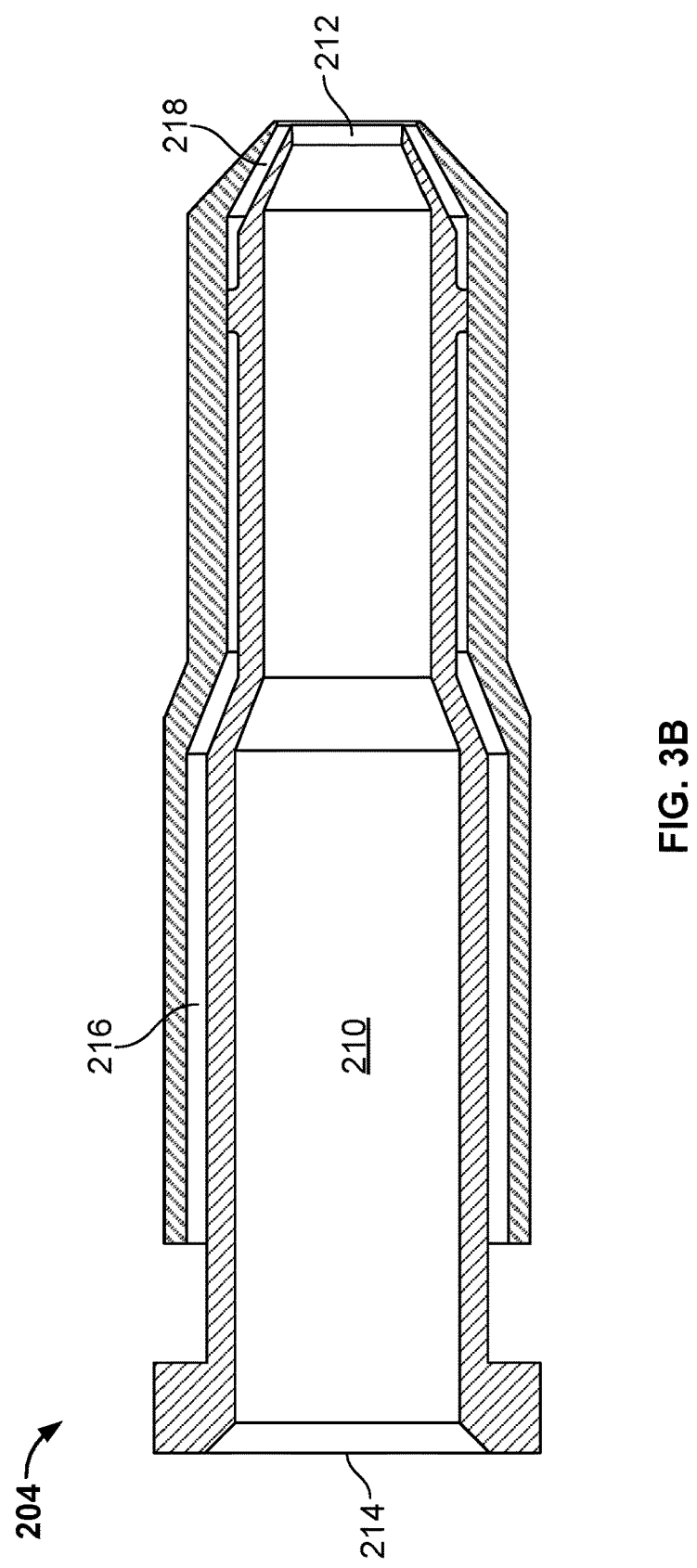
FIG. 3B is a half, side cross-sectional view of a fuel injector of the gas turbine combustor assembly shown in FIG. 2.

FIG. 3B is a half, side cross-sectional view of a fuel injector 204. In this example, the fuel injectors 204 are external mixing air-blast liquid fuel injectors. The fuel injectors 204 include a primary air passage 210 terminating in a converging-nozzle outlet 212. The inlet 214 of the primary air passage 210 is in fluid communication with the outlet of the compressor 16, and therefore receives a continuous stream of high-pressure air. In some examples, the primary air passage 210 includes a swirler element designed to impart a swirling flow pattern on primary airflow before exiting the outlet 212.

An annulus fuel passage 216 surrounds the primary air passage 210. The fuel passage inlet opens to a fuel supply passage of the corresponding fuel injector support structure 208. The fuel passage 216 extends axially downstream to a narrow annular outlet 218 surrounding the primary air passage outlet 212. The outlet 218 acts as a "prefilmer," spreading the liquid fuel into a thin film. In some examples, the fuel passage 216 includes a swirler element designed to impart a swirling flow pattern on the liquid fuel before exiting the fuel passage outlet 218.

Although external mixing fuel injectors are shown and described, it is appreciated that other types of fuel injectors are embraced by the scope of the present disclosure. For example, internal mixing simplex fuel injectors, hybrid fuel injectors and/or other types of fuel injectors could be used.

Referring back to FIGS. 2 and 3A, the combustor dome 206 facilitates the mixing of liquid fuel and air ejecta from the fuel injectors 204 with a secondary swirling airflow. The mixing involves a shearing interaction between the primary airflow, the annular film of liquid fuel, and the secondary airflow. The mixing results in the atomizing of the liquid fuel into a fine mist of fuel droplets just upstream of a primary combustion zone, where the fuel-air mixture is ignited. The secondary swirling airflow dilutes the fuel-air ratio and imparts (or augments) a swirling motion on ejecta from the fuel injectors 204. The swirling motion results, among other things, in improved flame stabilization and improved mixing.

The combustor dome 206 includes a collection of dome stators 220, one dome stator installed on each fuel injector 204, and an annular dome sleeve 222 carried by the collection of dome stators. The dome stators 220 are fixedly mounted to the fuel injectors 204 carried by the support structures 208. Thus, the dome stators 220 and fuel injectors 204 are held in a stationary position relative to the dome sleeve 222. The dome sleeve 222 includes an inner sleeve 222a, a center sleeve 222b, and an outer sleeve 222c. Each of the dome sleeves 222a, 222b, and 222c is an independent ring-shaped structure with radial surfaces contoured to fit alongside a radially adjacent dome sleeve. The dome sleeves 222a, 222b, and 222c are aligned with respective groups of fuel injectors 204 and corresponding dome stators 220. The dome sleeves 222a, 222b, and 222c can be used to enable airflow staging, by facilitating independent regulation of the secondary airflow through each dome sleeve. Regulating the secondary airflow can be used as a control variable to attain various characteristics (e.g., fuel-air ratio) in the fuel-air mixture entering the primary combustion zone.

Figure 4A:
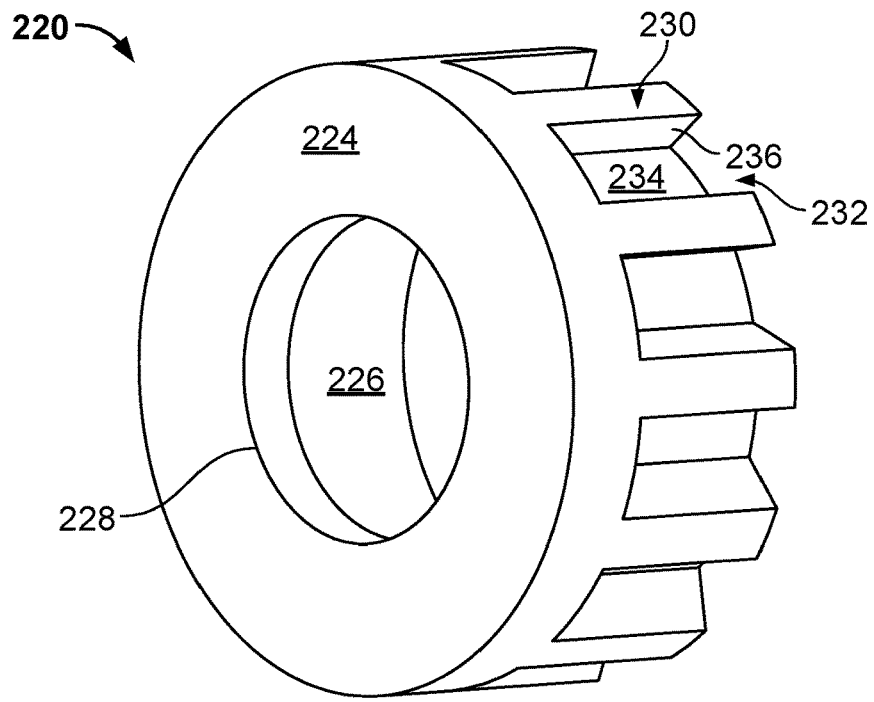
FIGS. 4A and 4B are front and rear perspective views of a dome stator of the gas turbine combustor assembly shown in FIG. 2.
Figure 4B:
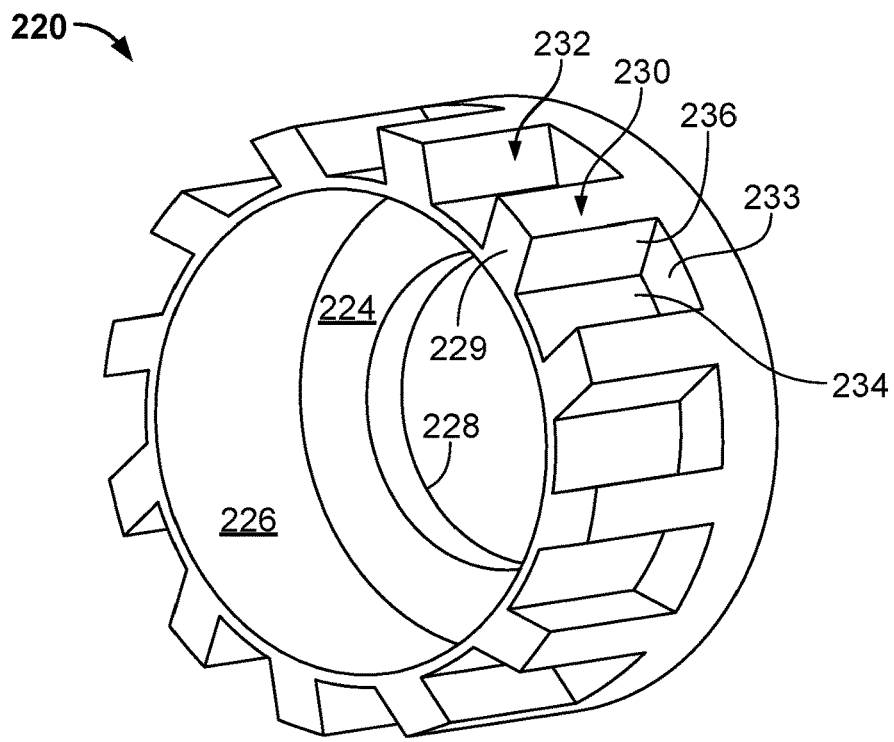

FIGS. 4A and 4B are front and rear perspective views of a dome stator 220. As shown, the dome stator 220 is a hollow cylindrical structure having a circular rear wall 224 extended outward axially by a side wall 226. The rear wall 224 defines a central opening 228 for receiving a corresponding fuel injector 204. The side wall 226 delimits the hollow interior of the dome stator 220. The outer surface of the side wall 226 defines an alternating circumferential pattern of upstanding ribs 230 and recessed grooves 232. The ribs 230 and grooves 232 extend axially from a surface 233 near the outer rim of the rear wall 224 to distal tips 229 at the forward edge of the side wall 226. The grooves 232 are defined by the open space between neighboring ribs 230 and the recessed floor surface 234 of the side wall 226. The ribs 230 exhibit slanted flank surfaces 236 that may be flat or curved.

Figure 5A:
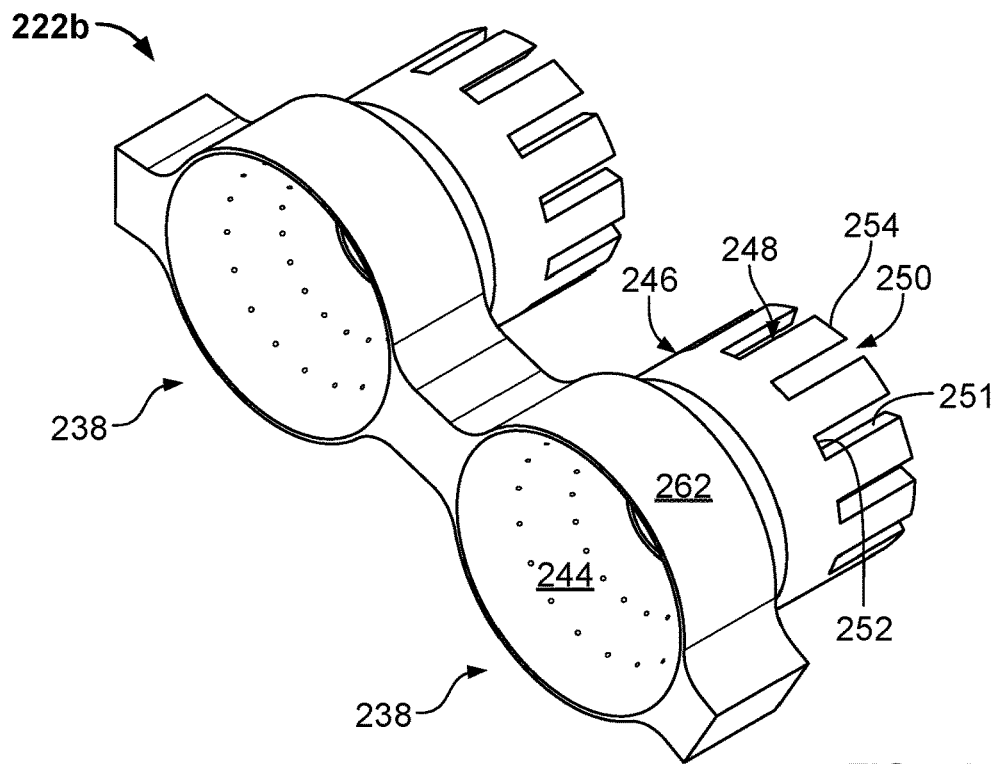
FIGS. 5A and 5B are front and rear perspective views of the center dome sleeve of the gas turbine combustor assembly shown in FIG. 2.
Figure 5B:
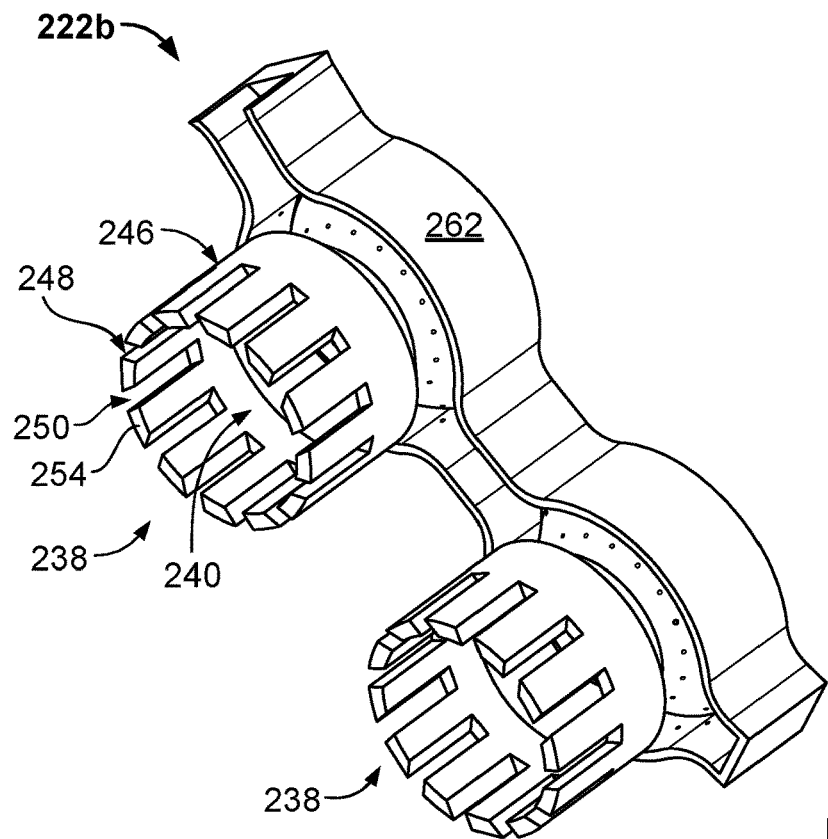
Figure 5C:
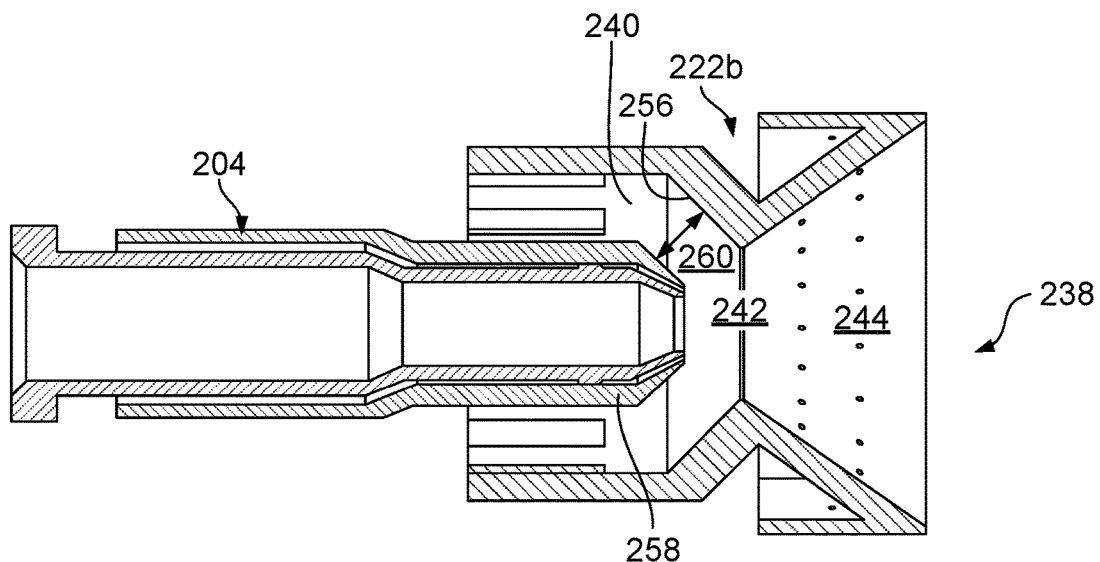
FIG. 5C is a half, cross-sectional view of the center dome sleeve of the gas turbine combustor assembly shown in FIG. 2 positioned relative to a fuel injector.

FIGS. 5A and 5B are front and rear perspective views of the center dome sleeve 222b. FIG. 5C is a cross-sectional view of the center dome sleeve 222b positioned relative to a fuel injector 204. The center dome sleeve 222b features a plurality of nozzle openings 238. The illustrated nozzle openings 238 are converging-diverging type nozzles having an inlet chamber 240 converging to a narrow throat 242 which opens to an expanding conical outlet chamber 244. The inlet chamber 240 is defined by a circular side wall 246. The rear portion of the side wall 246 defines an alternating circumferential pattern of fingers 248 and sockets 250. The fingers 248 and sockets 250 extend axially from a base surface 252 of the side wall 246 to distal tips 254 at the rearward edge of the side wall 246. The sockets 250, defined by the open space between neighboring fingers 248, are through-holes that traverse the entire thickness of the side wall 246. The fingers 248 have slanted flank surfaces 251 that are complementary to the slanted flank surfaces 236 of the dome stator's 220 ribs 230.

The forward portion of the inlet chamber 240 is a conical shaped region presenting a converging inner surface 256. The inner surface 256 cooperates with a converging outer surface 258 of the conical shaped outlet of the fuel injector 204 to define a pinch gap 260 between the surfaces. The pinch gap 260 is positioned upstream of the throat 242.

The center doom sleeve 222b includes an outer lip 262 peeling back from the exit of the outlet chamber 244. The outer lip 262 is contoured to match the outer lip of the adjacent inner dome sleeve 222a and outer dome sleeve 222c. Thus, the dome sleeves 222a, 222b, and 222c are designed to fit together like puzzle pieces in sliding contact with one another.

Figure 6:
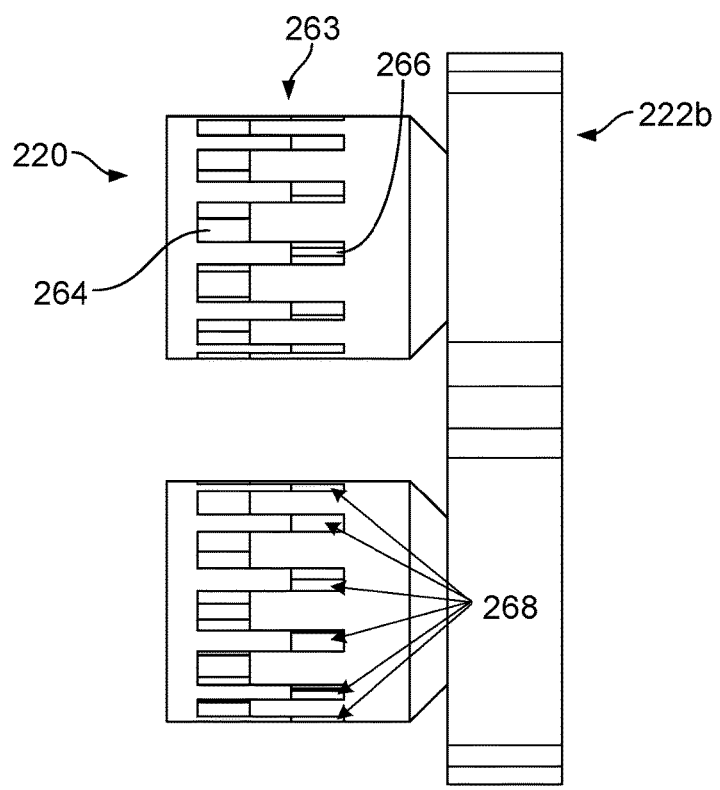
FIG. 6 is a top view of the center dome sleeve of the gas turbine combustor assembly shown in FIG. 2 coupled with corresponding dome stators.

FIG. 6 is a top view of the center dome sleeve 222b coupled with corresponding dome stators 220. As shown, the ribs 230 and grooves 232 of the dome stator 220 form an interlocking finger joint 263 with the fingers 248 and sockets 250 of the center dome sleeve 222b. That is, the ribs 230 of the dome stator 220 are received by the sockets 250 of the center dome sleeve 222b, and the fingers 248 of the center dome sleeve 222b are received by the grooves 232 of the dome stator 222. The fingers 248 of the center dome sleeve 222b rest on the floor surface 234 of the grooves 232 on the dome stator 220, and the complementary flank surfaces 251 and 236 of the fingers 248 and ribs 230 are in sliding contact. Thus, movement of the center dome sleeve 222b relative to the dome stator 220 allowed in the axial direction, but inhibited in all other directions.

As shown, the finger joint 263 is remains partially open, leaving radial gaps 264 between the tips 229 of the ribs 230 of the dome stator 220 and the side wall surface 252 of the center dome sleeve 222b, and radial gaps 266 between the tips 254 of the fingers 248 of the dome sleeve 222b and the rear wall surface 233 of the dome stator 220. The radial gaps 266 are open to the inlet chamber 240 of the center dome sleeve 222b. As a collective, the radial gaps 266 form a radial air inlet 268 for receiving a secondary flow of air added to the liquid fuel and primary airflow exiting the fuel injectors 204. The slanted flank surfaces 251 and 236 of the fingers 248 and ribs 230 cause the radial gaps 266 to be angled relative to the tangent planes of the circular side walls of the dome stator 220 and center dome sleeve 222b. The angled radial gaps 266 impart a swirling motion on the secondary airflow.

The open area of the radial gaps 266 can be increased or decreased by moving the center dome sleeve 222b relative to the stationary dome stator 220. Moving the center dome sleeve 222b away from the dome stator 220 increases the axial dimension of the radial gaps 266 and therefore increases the open area of the radial gaps. On the other hand, moving the center dome sleeve 222b towards the dome stator 222 decreases the axial dimension of the radial gaps 266 and therefore decreases the open area of the radial gaps. Increasing or decreasing the open area of the radial gaps 266 adjusts the flow area of the air inlet 268 and thus the flow rate of the secondary airflow. When the radial gaps 266 have more open area, the overall flow area of the air inlet 268 is larger and the flow rate of the secondary airflow is greater, and vice versa.

Figure 7:
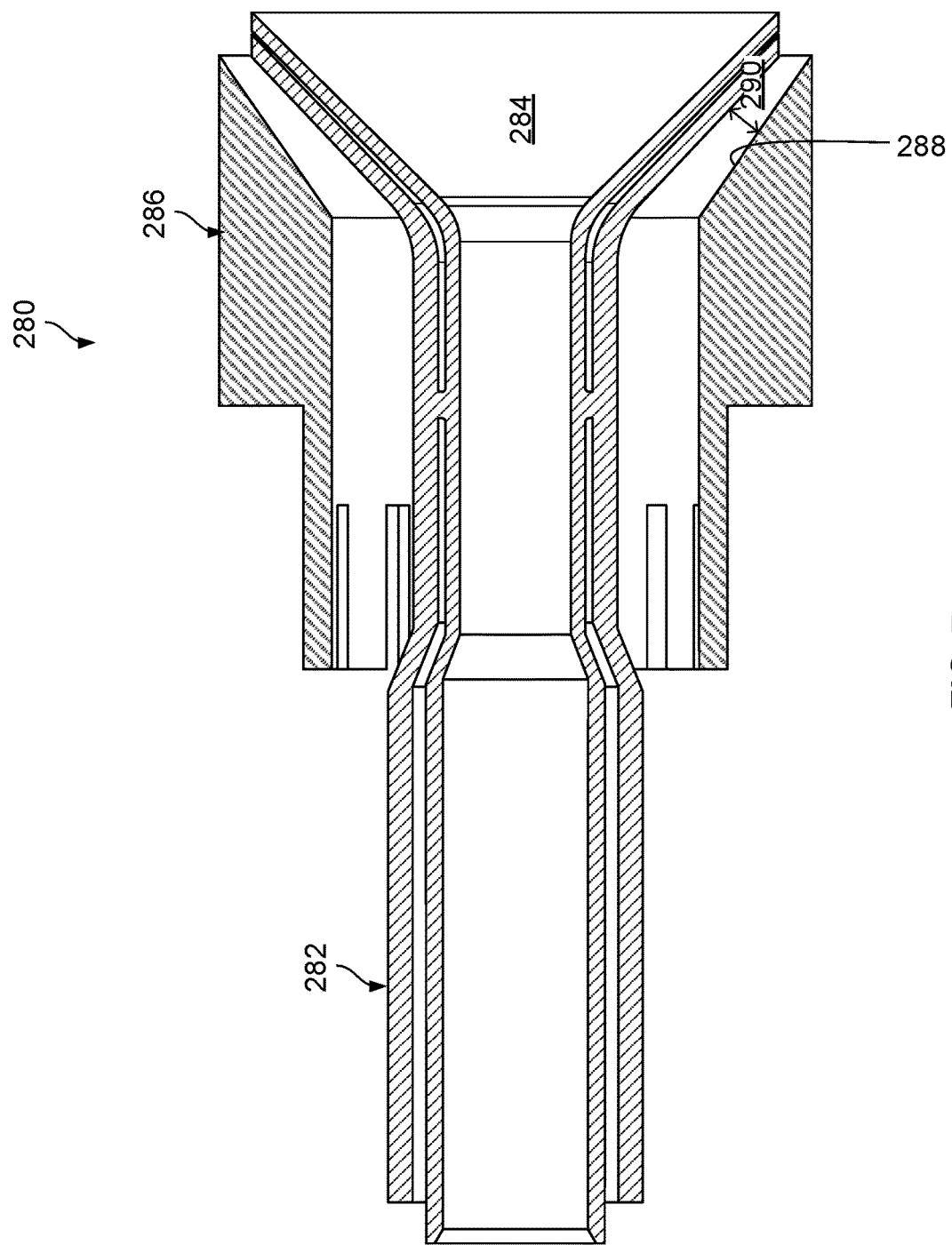
FIG. 7 is a half, side cross-sectional view of a dome sleeve featuring a nozzle opening with a flared outlet positioned relative to a fuel injector having a diverging-nozzle outlet.

FIG. 7 is a half, side cross-sectional view of a dome sleeve 280 positioned relative to a fuel injector 282. In this example, the fuel injector 282 is provided with a diverging-nozzle outlet 284. The nozzle opening 286 of the dome sleeve 280 features a flared outlet 288 that accommodates the diverging-nozzle outlet 284 of the fuel injector 282. Together, the diverging-nozzle outlet 284 of the fuel injector 282 and the flared outlet 288 of the dome sleeve 280 define a pinch gap 290.

Additionally, and referring back to FIG. 5C, axial movement of the center dome sleeve 222b relative to the stationary fuel injectors 204 adjusts the flow area of the pinch gap 260; widening the pinch gap when the center dome sleeve is moved away from the fuel injectors, and narrowing the pinch gap when the center dome sleeve is moved towards the fuel injectors. Adjustment of the flow area of the air inlet 268 and the flow area of the pinch gap 260 are achieved simultaneously and proportionately or "in-phase." In-phase adjustment of the air inlet 268 and pinch gap 260 maintains a balance between the flow rate of the secondary airflow, the swirl strength of the secondary airflow, and the shearing interaction between the secondary airflow and the liquid fuel and primary airflow ejecta from the fuel injectors 204. When the air inlet 268 and pinch gap 260 are smaller, the flow rate of the secondary air is lesser. On the other hand, when the air inlet 268 and the pinch gap 260 are larger, the flow rate of secondary airflow is greater. In any case the airflow's swirling strength and the shearing interaction with fuel are balanced and maximized.

The inner dome sleeve 222a and the outer dome sleeve 222c function identically to the center dome sleeve 222b. Each of the dome sleeves 222a, 222b, and 222c can be moved independently relative to the stationary dome stators 220 and fuel injectors 204 to locally regulate the fuel-air mixture entering the primary combustion zone. In this example, the inner dome sleeve 222a regulates the fuel-air mixture from fuel injectors 204 arranged along the inner diameter of the combustor; the outer dome sleeve 222c regulates the fuel-air mixture from fuel injectors 204 arranged along the outer diameter of the combustor, and the center dome sleeve 222b regulates the fuel-air mixture of fuel injectors arranged between the inner dome sleeve 222a and the outer dome sleeve 222c. When controlled independently, the dome sleeves 222a, 222b, and 222c can be used to achieve a gradient fuel/air ratio in the radial direction of the combustor.

Figure 8:
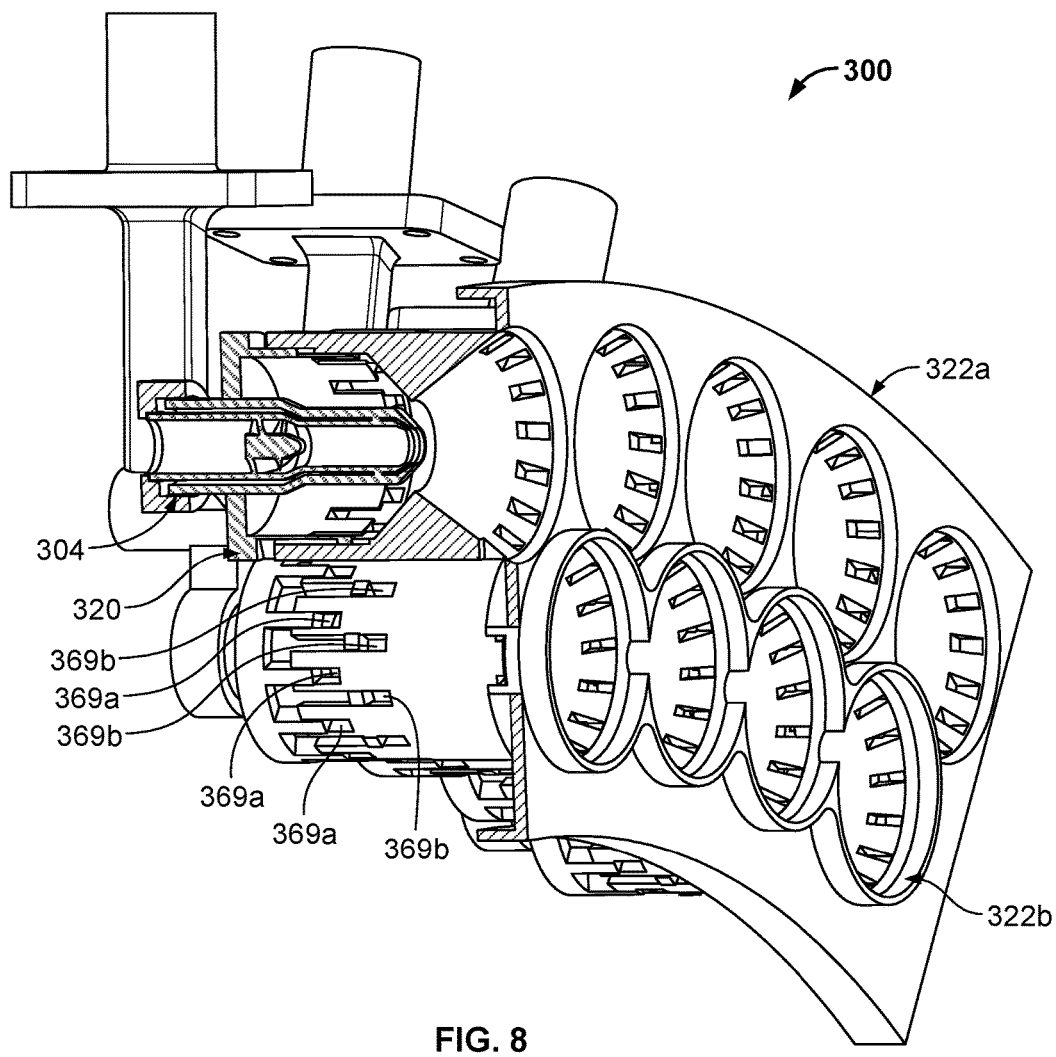
FIG. 8 is a half, perspective cross-sectional view of a dual-dome annular gas turbine combustor assembly.

FIG. 8 is a half, perspective cross-sectional view of a dual-dome annular gas turbine combustor assembly 300. The combustor assembly 300 is similar to the combustor assembly 200. However, in this example, the combustor assembly 300 includes two dome sleeves (as opposed to three), a first dome sleeve 322a aligned with fuel injectors 304 arranged along the outer diameter of the combustor, and a second dome sleeve 322b aligned with fuel injectors along the inner diameter of the combustor. The first dome sleeve 322a and the second dome sleeve 322b have independent axial motion against the stators 320.

Additionally, each of the nozzle sleeves 322a and 322b has two sets of secondary adjustable airflow openings 269a, and 269b separated axially. One set of the openings may have the flank surfaces that can be flat or curved and slanted in opposite angle to the other set so to forms an air swirling direction opposite to that of the other's.

Figure 9A:
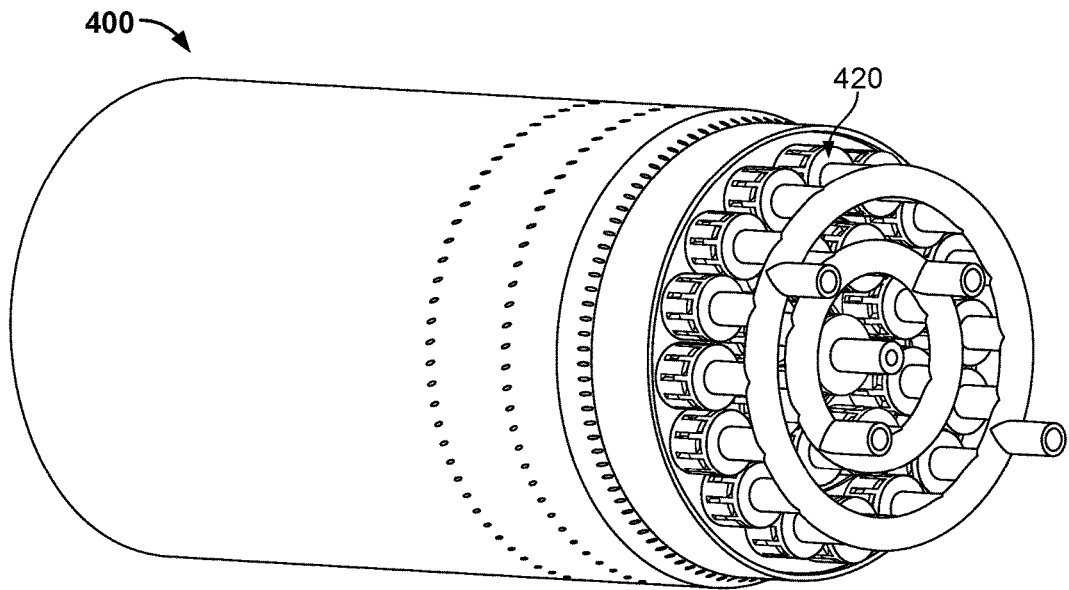
FIG. 9A is a perspective view of a can-type gas turbine combustor assembly.
Figure 9B:
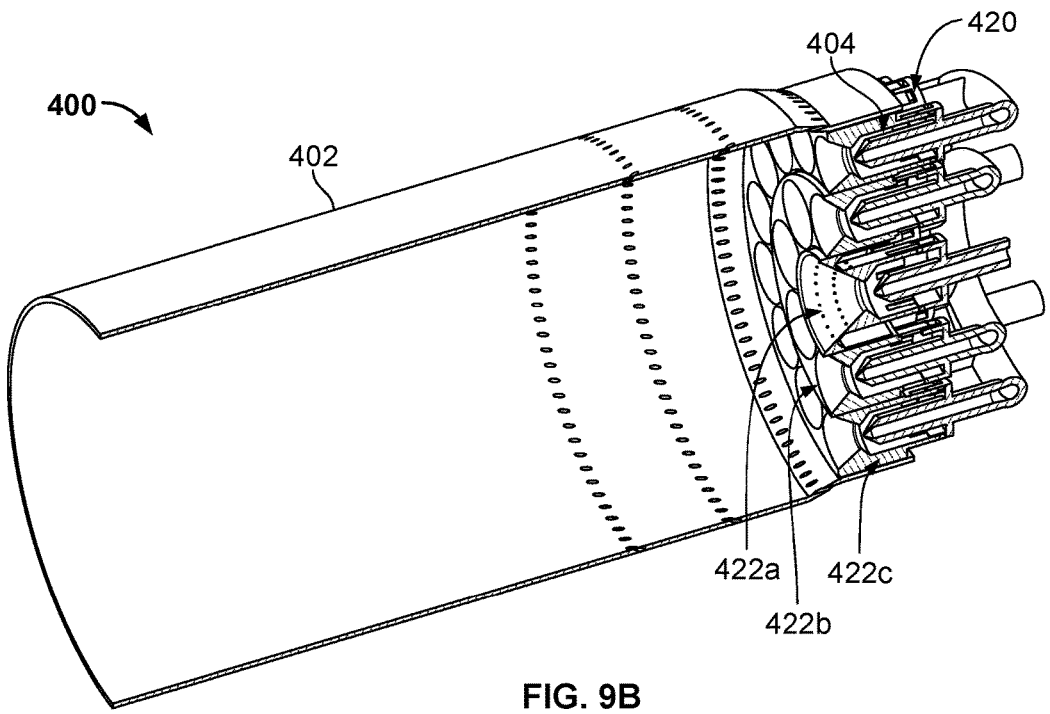
FIG. 9B is a half, perspective cross-sectional view of the can-type gas turbine combustor assembly shown in FIG. 9A.

FIG. 9A is a perspective view of a can-type gas turbine combustor assembly 400. FIG. 9B is a half, perspective cross-sectional view of the gas turbine combustor assembly 400 shown in FIG. 9A. The combustor assembly 400 is similar to the combustor assembly 200 described above. In this example, the fuel injectors 404, dome stators 420, and dome sleeves 422a, 422b, and 422c, are arranged in a miniature self-contained unit. The combustor assembly 400 is shielded by a combustion shield 402. Similar to the combustor assembly 300, each of the dome sleeves 422a, 422b, and 422c can be controlled independently to regulate the local fuel-air mixture. In some applications, multiple can-type combustor assemblies 400 are arranged around the main shaft, and their shared exhaust is fed to the turbine 24.

The following discussion will reference two specific examples of a technique for controlling fuel combustor assemblies such as described above. For ease of discussion, the examples are described with reference to the gas turbine engine 10 and the combustor assembly 200. However, these examples are provided solely for illustrative purpose and should not be considered as limiting the present disclosure in any way.

Example 1

In this example, the gas turbine engine 10 is operated at a low power condition (e.g., a startup or idle condition). Thus, the flow rate of liquid fuel provided to the fuel ejectors 204 is relatively low. To maintain stable combustion, the fuel-air ratio, while constant over the entire combustor 100, can be made locally rich at particular regions of the combustor. In one example, the fuel injectors 204 aligned with the outer dome sleeve 222c are rendered temporarily inoperable, such that the entire flow of liquid fuel is delivered to the fuel injectors aligned with the inner dome sleeve 222a and the center dome sleeve 222b. To increase the local fuel-air ratio provided by the operable injectors, the flow rate of the secondary air is reduced by moving the inner dome sleeve 222a and the center dome sleeve 222b towards the stationary dome stators 220 and fuel injectors 204. To compensate for the reduced secondary airflow through the inner dome sleeve 222a and the center dome sleeve 222b, the secondary airflow through the outer dome sleeve is proportionately increased by moving the outer dome sleeve 222c (aligned with the inoperable fuel injectors) away from the dome stators 220 and fuel injectors 204.

Example 2

In this example, the gas turbine engine 10 is operated at a high power condition. Thus, the flow rate of liquid fuel provided to the fuel ejectors 204 is relatively high. In this case, to manage the thermal stress on the turbine 24, a fuel-air ratio gradient is created along the radial direction of the combustor 100, with the highest fuel-air ratio being near the inner diameter of the combustor and the lowest fuel-air ratio being near the outer diameter of the combustor. This configuration provides that the highest temperature combustion products 22 will be delivered to the outer portion of the turbine blades, and the lowest temperature combustion products will be deviled to the inner portion (or "root") of the turbine blades. This fuel-air ratio gradient is achieved by moving the inner dome sleeve 222a away from the stationary dome stators 220 and fuel injectors 204 to increase the flow rate of secondary air through the inner dome sleeve, while moving the outer dome sleeve 222c towards the dome stators and fuel injectors to proportionately decrease the flow of secondary air through the outer dome sleeve.

Other implementations can also be achieved. For example, in a variable geometry gas turbine engine, the adjustable dome sleeves of the combustor assembly can be operated to match the different levels of airflow provided by the compressor. Thus, ensuring that the combustor assembly is resized for the engine as the flow path geometry is varied. In such applications, the dome sleeves can be moved axially forward or rearward in unison to increase or decrease the overall airflow through the combustor to match the compressor.

The use of terminology such as "front," "rear," "top," "bottom," "over," "above," and "below" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

A number of embodiments of the invention have been described. Nevertheless, it will be understood that various modifications may be made without departing from the spirit and scope of the inventions.

What is claimed is:

1. A gas turbine combustor assembly, comprising:
    a fuel injector;
    a dome stator around the fuel injector;
    a dome sleeve coupled to the dome stator and defining:
        an air inlet opening with the dome stator, the dome sleeve carried to move with respect to the dome stator and change a flow area of the air inlet opening as the dome sleeve moves; and
        a nozzle sloping downstream from the air inlet opening toward an outlet of the combustor assembly, the sloping nozzle axially aligned with and radially surrounding at least a portion of the fuel injector, the sloping nozzle cooperating with a surface of the fuel injector to define an annular pinch gap adjacent an outlet of the fuel injector, and the sloping nozzle coupled to move with the dome sleeve and change a flow area through the annular pinch gap as the dome sleeve moves.

2. The combustor assembly of claim 1, wherein the sloping nozzle converges to a throat mixing region at a point down downstream from the annular pinch gap.

3. The combustor assembly of claim 1, wherein the sloping nozzle diverges to accommodate a flared surface of the fuel injector outlet.

4. The combustor assembly of claim 1, wherein the fuel injector, the dome stator, and the dome sleeve are positioned along a shared axis, and the air inlet opening is oriented in a radial direction relative to the shared axis.

5. The combustor assembly of claim 4, wherein the air inlet opening comprises an angled air swirler side surface.

6. The combustor assembly of claim 1, wherein the dome sleeve is coupled to the dome stator by a finger joint coupling, the air inlet comprising radial gaps in the finger joint.

7. The combustor assembly of claim 6, wherein the finger joint comprises a set of alternating ribs and grooves formed on the dome stator and an interlocking set of alternating fingers and sockets formed on the dome sleeve.

8. The combustor assembly of claim 1, wherein the fuel injector comprises one of a plurality of fuel injectors and the dome stator comprises one of a plurality of dome stators paired with respective fuel injectors, and
    wherein the dome sleeve is coupled to the plurality of dome stators, defining a respective air inlet opening with each dome stator.

9. The combustor assembly of claim 1, further comprising:
    a second fuel injector;
    a second dome stator around the second fuel injector;
    a second dome sleeve coupled to the second dome stator and defining:
        a second air inlet opening with the second dome stator, the second dome sleeve carried to move with respect to the second dome stator and change a flow area of the second air inlet opening as the second dome sleeve moves; and
        a second nozzle sloping downstream from the second air inlet opening toward the outlet of the combustor assembly and defining a second annular pinch gap adjacent an outlet of the second fuel injector, the second sloping nozzle coupled to move with the second dome sleeve and change a flow area through the second pinch gap as the second dome sleeve moves.

10. The combustor assembly of claim 9, wherein the second dome sleeve is positioned radially adjacent of a first dome sleeve.

11. The combustor assembly of claim 9, wherein the second dome sleeve is coupled to a flange of a first dome sleeve.

12. The combustor assembly of claim 9, wherein the second dome sleeve is carried to move independently of a first dome sleeve.

13. The combustor assembly of claim 9, wherein the second dome sleeve is carried to move in unison with a first dome sleeve in at least one axial direction.

14. The combustor assembly of claim 9, wherein the second dome sleeve is carried to move independently of the first dome sleeve in at least one axial direction.

15. The combustor assembly of claim 9, wherein the second fuel injector is coupled to a different fuel source than the fuel injector.

16. A method of operating a gas turbine engine assembly, the gas turbine engine assembly comprising: a fuel injector; a dome stator around the fuel injector; a dome sleeve coupled to the dome stator and defining: an air inlet opening with the dome stator, the dome sleeve carried to move with respect to the dome stator and change a flow area of the air inlet opening as the dome sleeve moves; and a nozzle sloping downstream from the air inlet opening toward an outlet of the gas turbine engine assembly, the sloping nozzle axially aligned with and radially surrounding at least a portion of the fuel injector, the sloping nozzle cooperating with a surface of the fuel injector to define an annular pinch gap adjacent an outlet of the fuel injector, and the sloping nozzle coupled to move with the dome sleeve and change a flow area through the annular pinch gap as the dome sleeve moves, the method comprising: directing an axial flow of fuel ejected from the fuel injector to a converging nozzle throat of the dome sleeve, the dome sleeve attached to the dome stator mounted fixedly to the fuel injector; directing a primary axial flow of gas ejected from the fuel injector toward the converging nozzle throat; receiving a secondary radial flow of gas from the air inlet opening defined by a coupling attaching the dome sleeve to the dome stator; directing the secondary radial flow of gas, through the annular pinch gap adjacent the outlet of the fuel injector, to the converging nozzle throat to mix with the axial flow of fuel and the primary axial flow of gas; and simultaneously changing a flow area through the air inlet opening and the annular pinch gap by moving the dome sleeve axially relative to the dome stator and the fuel injector.

17. The method of claim 16, wherein simultaneously changing a flow area through the air inlet opening and the annular pinch gap comprises proportionately changing the flow area through the air inlet opening and the annular pinch gap.

18. The method of claim 16, further comprising changing a flow rate of fuel provided to the fuel injector, and
wherein the flow area through the air inlet opening and the annular pinch gap is changed in response to the change in the flow rate of the fuel.

19. The method of claim 16, further comprising changing a flow rate of the primary axial flow of gas provided to the fuel injector, and
wherein the flow area through the air inlet opening and the annular pinch gap is changed in response to the change in the flow rate of the primary axial flow of gas.

20. The method of claim 16, further comprising imparting a swirling motion on the secondary radial flow of gas before the secondary radial flow of gas is directed through the annular pinch gap.

21. The method of claim 16, further comprising simultaneously changing a flow area through a second inlet opening and a second pinch gap by moving a second dome sleeve axially relative to a second dome stator and a second fuel injector,
wherein the flow area through the second inlet opening and the second pinch gap is changed independently of the flow area through the air inlet opening and the annular pinch gap.

22. A gas turbine engine comprising:
a compressor;
combustor assembly fluidically coupled to the compressor, and comprising:
a fuel injector;
a dome stator around the fuel injector;
a dome sleeve coupled to the dome stator and defining:
an air inlet opening with the dome stator, the dome sleeve carried to move with respect to the dome stator and change a flow area of the air inlet opening as the dome sleeve moves; and
a nozzle sloping downstream from the air inlet opening toward an outlet of the combustor assembly, the sloping nozzle axially aligned with and radially surrounding at least a portion of the fuel injector, the sloping nozzle cooperating with a surface of the fuel injector to define an annular pinch gap adjacent an outlet of the fuel injector, and the sloping nozzle coupled to move with the dome sleeve and change a flow area through the annular pinch gap as the dome sleeve moves; and
a turbine fluidically coupled to the combustor assembly.

* * * * *